US011790305B2

(12) United States Patent
Tripathy et al.

(10) Patent No.: US 11,790,305 B2
(45) Date of Patent: Oct. 17, 2023

(54) METHODS AND APPARATUS FOR AUTOMATIC ROUTE ASSIGNMENT

(71) Applicant: Walmart Apollo, LLC, Bentonville, AR (US)

(72) Inventors: Chittaranjan Tripathy, Sunnyvale, CA (US); Abhijeet Rajendra Phatak, Sunnyvale, CA (US); Kaiyi Zhang, Blacksburg, VA (US); Rekha Venkatakrishnan, Dublin, CA (US); Ioannis Pavlidis, Boulder, CO (US)

(73) Assignee: Walmart Apollo, LLC, Bentonville, AR (US)

( * ) Notice: Subject to any disclaimer, the term of this patent is extended or adjusted under 35 U.S.C. 154(b) by 72 days.

(21) Appl. No.: 17/454,878

(22) Filed: Nov. 15, 2021

(65) Prior Publication Data
US 2022/0156680 A1    May 19, 2022

Related U.S. Application Data

(60) Provisional application No. 63/114,662, filed on Nov. 17, 2020.

(51) Int. Cl.
*G06Q 10/0631* (2023.01)
*G06Q 10/0834* (2023.01)
(Continued)

(52) U.S. Cl.
CPC ......... *G06Q 10/083* (2013.01); *G06Q 10/047* (2013.01); *G06Q 10/063112* (2013.01); *G06Q 10/0834* (2013.01)

(58) Field of Classification Search
CPC .................................................. G06N 20/00
See application file for complete search history.

(56) References Cited

U.S. PATENT DOCUMENTS 7,363,126 B1 *  4/2008  Zhong ................ G01C 21/3484
                                                          701/25
7,840,319 B2    11/2010  Zhong
(Continued)

FOREIGN PATENT DOCUMENTS

EP        3806007 A1     4/2021
WO     2016040808 A1     3/2016

OTHER PUBLICATIONS

Ramachandran, Deepak, et al.; "Driver Familiarity Modeling for Generating Navigation Directions"; Oct. 6-9, 2013; 16th International IEEE Annual Conference on Intelligent Transportation Systems; pp. 2193-2200 (Year: 2013).*

(Continued)

*Primary Examiner* — Resha Desai
*Assistant Examiner* — Michael C Moroney
(74) *Attorney, Agent, or Firm* — Morgan, Lewis & Bockius LLP; Manita Rawat

(57) ABSTRACT

This application relates to apparatus and methods for automatic delivery route generation and assignment. In some examples, a computing device determines delivery locations for each of a plurality of previous routes taken by each of a plurality of drivers over a period of time. The computing device also obtains a plurality of current routes to be assigned to the plurality of drivers. Further, the computing device determines a familiarity value for each of the plurality of drivers for each of the plurality of current routes based on the delivery locations of the previous routes taken by each driver. The computing device assigns each of the plurality of drivers to a current route based on the determined familiarity values, and stores the assignments in a data repository. In some examples, the computing device transmits the assignments to another computing device, such as a computing device of each driver.

20 Claims, 9 Drawing Sheets

(51) Int. Cl.
G06Q 10/083 (2023.01)
G06Q 10/047 (2023.01)

(56) References Cited

U.S. PATENT DOCUMENTS

| | | | |
|---|---|---|---|
| 9,476,724 | B2 | 10/2016 | Caine et al. |
| 10,565,543 | B1 | 2/2020 | Mo et al. |
| 2016/0300186 | A1* | 10/2016 | Scharaswak ....... G06Q 10/0835 |
| 2018/0012151 | A1* | 1/2018 | Wang .................... G06Q 10/08 |
| 2018/0039938 | A1* | 2/2018 | Dearing ............. G06Q 30/0241 |
| 2018/0089608 | A1* | 3/2018 | O'Hare ............... G06Q 10/047 |
| 2018/0202818 | A1* | 7/2018 | Zhang ................ G01C 21/3407 |
| 2019/0130301 | A1* | 5/2019 | Fu ............................ G06N 5/04 |
| 2019/0180399 | A1* | 6/2019 | Tajammul ............. G06Q 50/28 |
| 2021/0110219 | A1* | 4/2021 | Ouellet ................. G06F 18/211 |
| 2021/0182787 | A1* | 6/2021 | Mouli ................ G06Q 10/0838 |
| 2021/0374669 | A1* | 12/2021 | Neumann ............. G16H 50/20 |
| 2022/0277331 | A1* | 9/2022 | Nash .................. G06Q 30/0206 |

OTHER PUBLICATIONS

Search and Examination Report dated Apr. 1, 2022 for corresponding GB Patent Application No. GB2115429.9.
The Intellectual Property Office of the United Kingdom, Examination Report issued in corresponding Application No. GB2115429.9, dated Dec. 6, 2022, 4 pages.

* cited by examiner

METHODS AND APPARATUS FOR AUTOMATIC ROUTE ASSIGNMENT

CROSS-REFERENCE TO RELATED APPLICATIONS

This application claims priority to U.S. Provisional Application Ser. No. 63/114,662 filed on Nov. 17, 2020 and entitled "METHODS AND APPARATUS FOR AUTOMATIC ROUTE ASSIGNMENT," and which is hereby incorporated by reference in its entirety.

TECHNICAL FIELD

The disclosure relates generally to delivery systems and, more specifically, to electronically delivery routes for item delivery.

BACKGROUND

At least some retailers deliver purchased items, such as groceries, to a customer. When an order is placed, the retailers must gather the purchased items and place them on a vehicle, such as a truck, for delivery. The delivery vehicle may collect the purchased goods for an order from a warehouse or store, pack the goods into boxes or totes, and deliver the purchased goods to a customer at a specified delivery address, such as to the customer's home. Some delivery management systems allow a customer to select a delivery window specifying a range of time when the goods may be delivered. Similarly, some delivery management systems allow delivery drivers to schedule times when they are available for delivery. Further, the delivery vehicles may be assigned to a delivery route to deliver the purchased items during the delivery windows selected by the customers.

These delivery management systems, however, have drawbacks. For example, drivers may be scheduled to deliver orders that, due to poor scheduling, cannot be delivered on time, e.g., within requested delivery windows. In some examples, purchased goods may perish before they are delivered. For example, ice cream may melt, or meat may spoil, before they are delivered. In yet other examples, a driver may take longer to deliver an order because the driver is lost or is not familiar with the area of delivery. This may have a cascading effect on subsequent deliveries, potentially missing promised delivery windows on other orders on the delivery schedule for that driver. These and other drawbacks may cause retailers financial losses, such as financial losses due to food spoiling, undelivered orders, rejected orders, and loss of customer loyalty for missing delivery time windows. Therefore, for these and other reasons, there are opportunities to improve current delivery management systems.

SUMMARY

The embodiments described are directed to delivery management systems that more efficiently schedule delivery vehicle drivers, which may improve and/or ensure on-time deliveries, reduce the number of undelivered orders, and/or increase customer loyalty and/or approval. In addition, the embodiments may reduce miles driven by delivery vehicles and thus provide cost savings with regard to delivery vehicle fuel and energy required to store items in the delivery vehicle, such as in chilled or frozen compartments of the delivery vehicle. As a result, a retailer employing one or more of these embodiments may benefit by expending less cost, effort, and time in scheduling activities (e.g., such as in rescheduling undelivered orders). The retailer may also enjoy an improvement to customer service and/or a reduction in delivery costs based on a reduction in delivery times and undelivered items. Other benefits may also be recognized by those skilled in the art.

In some embodiments, a computing device determines delivery locations for each of a plurality of previous routes taken by each of a plurality of drivers over a period of time. The computing device also obtains a plurality of current routes to be assigned to the plurality of drivers. Further, the computing device determines a familiarity value for each of the plurality of drivers for each of the plurality of current routes based on the delivery locations of the previous routes taken by each driver. The computing device assigns each of the plurality of drivers to a current route based on the determined familiarity values, and stores the assignments in a data repository. In some examples, the computing device transmits the assignments to another computing device, such as a computing device of each driver.

In some embodiments, a system includes a memory device, and a computing device communicatively coupled to the memory device. The computing device is configured to determine a plurality of delivery routes to be assigned to a plurality of drivers. Further, the computing device is configured to receive historical route data for each of the plurality of drivers, where the historical route data identifies previous delivery routes for each driver. The computing device is also configured to determine, for each of the plurality of drivers, a plurality of familiarity values, each familiarity value corresponding to a delivery route of the plurality of delivery routes to be assigned, where each of the familiarity values is determined based on the historical route data corresponding to each driver. In some examples, the computing device determines the plurality of familiarity values based on preferences for each of the plurality of drivers. The computing device is further configured to determine an assignment of each of the plurality of drivers to at least one of the plurality of delivery routes based on the familiarity values. The computing device is also configured to generate assignment data identifying the determined assignments of each of the plurality of drivers to the at least one of the plurality of delivery routes, and store the assignment data within the memory device.

In some embodiments, a method by a computing device includes determining a plurality of delivery routes to be assigned to a plurality of drivers. The method also includes receiving historical route data for each of the plurality of drivers, where the historical route data identifies previous delivery routes for each driver. Further, the method includes determining, for each of the plurality of drivers, a plurality of familiarity values, each familiarity value corresponding to a delivery route of the plurality of delivery routes to be assigned, where each of the familiarity values is determined based on the historical route data corresponding to each driver. In some examples, the method includes determining the plurality of familiarity values based on preferences for each of the plurality of drivers. The method also includes determining an assignment of each of the plurality of drivers to at least one of the plurality of delivery routes based on the familiarity values. The method further includes generating assignment data identifying the determined assignments of each of the plurality of drivers to the at least one of the plurality of delivery routes, and storing the assignment data within a memory device.

In yet other embodiments, a non-transitory computer readable medium has instructions stored thereon, where the instructions, when executed by at least one processor, cause a computing device to perform operations that include determining a plurality of delivery routes to be assigned to a plurality of drivers. The operations also include receiving historical route data for each of the plurality of drivers, where the historical route data identifies previous delivery routes for each driver. Further, the operations include determining, for each of the plurality of drivers, a plurality of familiarity values, each familiarity value corresponding to a delivery route of the plurality of delivery routes to be assigned, where each of the familiarity values is determined based on the historical route data corresponding to each driver. In some examples, the operations include determining the plurality of familiarity values based on preferences for each of the plurality of drivers. The operations also include determining an assignment of each of the plurality of drivers to at least one of the plurality of delivery routes based on the familiarity values. The operations further include generating assignment data identifying the determined assignments of each of the plurality of drivers to the at least one of the plurality of delivery routes, and storing the assignment data within a memory device.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
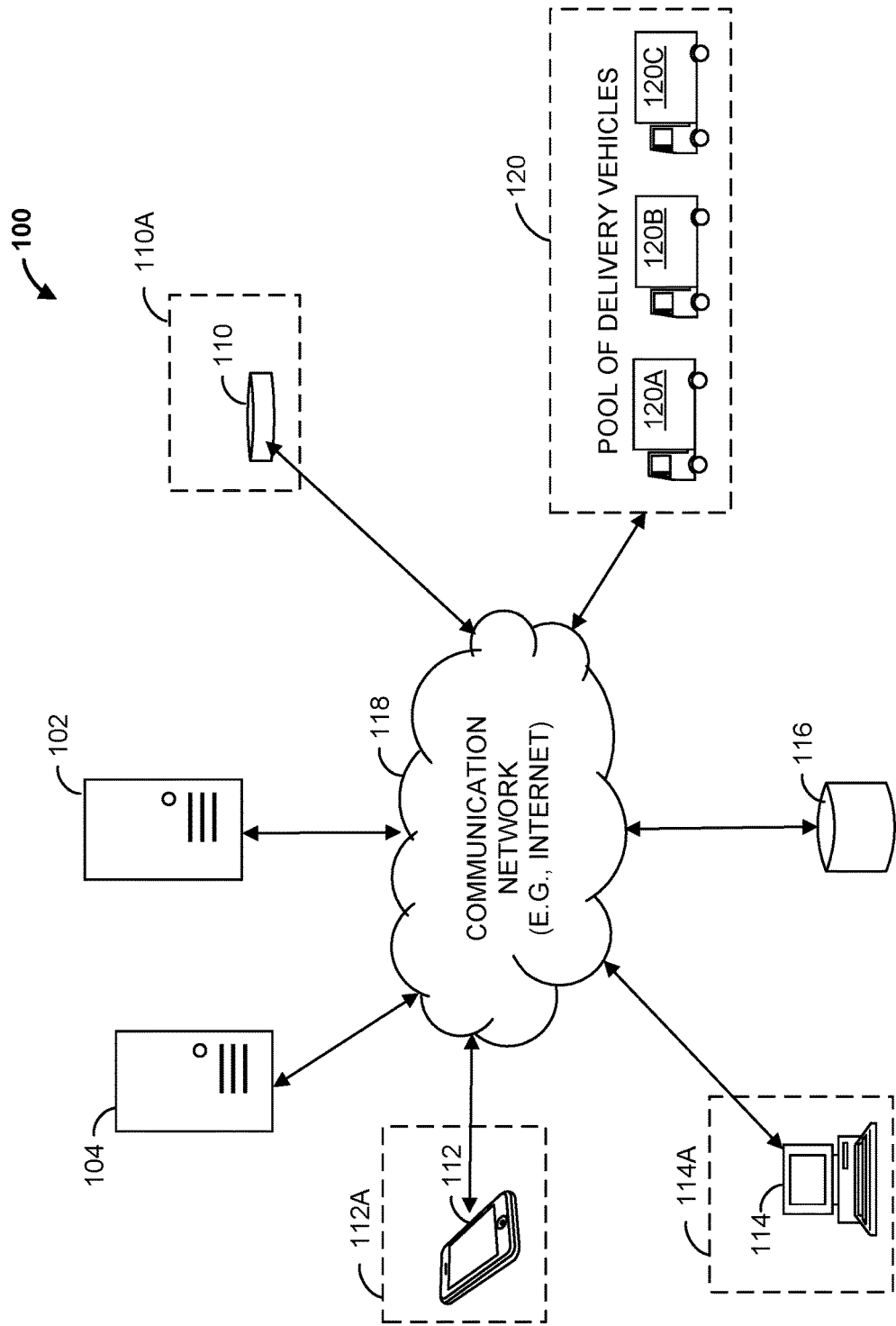
FIG. 1 is a block diagram of delivery management system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

The embodiments assign drivers to delivery routes based on each driver's familiarity with a geographical area. For example, for more efficient execution of last-mile purchase order deliveries, having a same driver deliver purchase orders to a same geographical area will tend to be more efficient. For example, assuming there are multiple deliveries that need to be made within a gated apartment with 100 homes on a daily basis, it is advantageous to have the same driver(s) make those deliveries, such as to reduce delivery times. For example, the driver's experience with the neighborhood may save time in terms of their familiarity of where to park the delivery vehicle, optimal paths to take to each delivery location, as well as having the customers become more familiar with the drivers that deliver the packages (e.g., which may result in higher customer satisfaction with the deliveries). Further, the same driver may become more familiar with security, elevator, or building access, thereby reducing delivery times to some deliver locations, such as difficult-to-locate building units.

In some embodiments, a system more efficiently assigns delivery drives to delivery routes generated by, for example, a route planner. For example, in some embodiments, a computing system assigns routes (e.g., routes generated by a route planning system) to drivers based on each driver's familiarity with a geography. To determine the driver's familiarity with a particular route, the system generates a "Route Familiarity (RF)" score. The RF scores (e.g., familiarity values) may be generated based on applying one or more machine learning models to feature data generated from, for example, data characterizing each driver's previous routes. The system employs the generated RF scores to determine the driver's familiarity with a current route to be assigned to the driver. The system may further model (e.g., formulate) a driver to route assignment as a bipartite graph matching problem based on available drivers and delivery routes. Based on the RF scores, the system may solve the bipartite matching problem, and may further assign the drivers to the delivery routes such that the assignments maximize a sum total of RF scores over all drivers. For example, as a result of the assignment, drivers may be assigned to routes they are more familiar with.

Turning to the drawings, FIG. 1 illustrates a block diagram of a delivery management system 100 that includes a delivery management computing device 102 (e.g., a server, such as an application server), a web server 104, one or more delivery vehicles 120A, 120B, 120C, database 116, and one or more customer computing devices 110, 112, 114 operatively coupled over communication network 118. Delivery management computing device 102, web server 104, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over communication network 118.

In some examples, each of delivery management computing device 102 and web server 104 can be a computer, a workstation, a laptop, a server such as a cloud-based server, or any other suitable computing device. For example, each of delivery management computing device 102 and web server 104 may be a server that includes one or more processing units, such as one or more graphical processing units (GPUs), one or more central processing units (CPUs), and/or one or more processing cores.

In some examples, each of multiple customer computing devices 110, 112, 114 can be a cellular phone, a smart phone, a tablet, a personal assistant device, a voice assistant device, a digital assistant, a laptop, a computer, or any other suitable device. In addition, each customer computing device 110, 112, 114 may be associated with a corresponding geographical location 110A, 112A, 114A, such as a delivery address (e.g., home address). Further, each delivery vehicle 120A, 120B, 120C may be part of a pool of delivery vehicles 120 available to make deliveries, such as purchase order deliveries, and may communicate via communication network 118 via any suitable processing device, such as a driver's mobile device or an onboard computing device.

Database 116 may be a tangible, non-transitory memory. For example, database 116 may be a remote storage device, such as a cloud-based server, a memory device on another application server, a networked computer, or any other suitable remote storage. Although shown remote to delivery management computing device 102, in some examples, database 116 can be a local storage device, such as a hard drive, a non-volatile memory, or a USB stick.

Although FIG. 1 illustrates three customer computing devices 110, 112, 114, delivery management system 100 can include any number of customer computing devices 110, 112, 114. Similarly, delivery management system 100 can include any number of delivery management computing devices 102, delivery vehicles 120A, 120B, 120C, web servers 104, and databases 116.

Communication network 118 can be a WiFi network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

In some examples, delivery management computing device 102, pool of delivery vehicles 120, and/or web server 104 are operated by a retailer, and multiple customer computing devices 110, 112, 114 are operated by customers of the retailer. In some examples, web server 104 hosts one or more retailer websites that allow a customer to purchase items, and may further allow the customer to schedule delivery of the purchased items. First customer computing device 110, second customer computing device 112, and N$^{th}$ customer computing device 114 may communicate with web server 104 over communication network 118. For example, each of multiple computing devices 110, 112, 114 may be operable to view, access, and interact with a website, such as a retailer's website, hosted by web server 104.

In some examples, web server 104 stores, within database 116, order data identifying and characterizing purchase orders placed by one or more customers (e.g., via one or more of customer computing devices 110, 112, 114). The order data may identify, for each purchase order, items purchased, a delivery address (e.g., delivery address 110A, 112A, 114A) to deliver the purchased items and, in some examples, a delivery time window to deliver the purchased items at the delivery address. Based on the order data, delivery management computing device 102 may generate routes to deliver the purchase orders within any requested delivery windows. The routes may be generated based on application of any suitable route planning model, where each route may identify one or more delivery locations for one or more purchase orders.

For example, a route planning model may solve the route planning problem, known as a capacitated vehicle routing problem with time windows (CVRPTW). The route planning model may receive, as inputs, outputs from road transit time models, outputs from doorstep delivery time models at each doorstep, order weights and volumes, vehicle capacities, and order delivery time windows promised to customers. The delivery time windows may be, for example, one or two hour delivery windows. The inputs may act as constraints in an optimization framework for a set of orders to be delivered to generate one or more routes where each route is a sequence of orders placed in one delivery truck along with a plan of delivering those within the customer-provided delivery time windows. The transit time models and doorstep delivery time models may be based on complex supervised machine learning models such as random forests, gradient boosting machines or neural networks, and generate data that is supplied as inputs to the route planner model. The route planner model itself may use a suite of optimization algorithms including, for example, simulated annealing, tabu search, genetic algorithms, linear programming, and other efficient methods of neighborhood search and geo-spatial clustering methods.

Further, database 116 further stores historical data for each of a plurality of drivers. The historical data identifies a history of delivery routes and locations for previously executed routes for each driver (e.g., delivery addresses, items delivered, time of delivery, etc.) and, in some examples, route preferences for each driver. Route preferences may include preferences or declinations to serve a particular geographical area (e.g., a zip code, a town, a geo-location, a neighborhood, etc.).

Delivery management computing device 102 determines available drivers to deliver the generated routes based on a driver's schedule (e.g., availability), and obtains from database 116 historical data corresponding to each available driver. Delivery management computing device 102 may obtain historical data for a predetermined temporal period such as, for example, six months. Based on the historical data and the generated routes, delivery management computing device 102 generates RF scores, where each RF score indicates a degree of familiarity a driver has with a particular route.

For example, given a driver i and a route j, delivery management computing device 102 may generate an RF score $\rho_{ij}$ that indicates a degree of familiarity that driver i has with route j. In some examples, the RF score $\rho_{ij}$ is computed as a fraction or percentage such that $\rho_{ij}$ is between 0 and 1, inclusively (i.e., $0 \leq \rho_{ij} \leq 1$), wherein 0 means no familiarity and 1 means the most familiarity.

For example, suppose a route R has m purchase orders that need to be delivered at corresponding locations. Each location may be defined, for example, by a delivery address (e.g., zip code, city, state, street address). Delivery management computing device 102 may determine a geographical location (e.g., a latitude and longitude) for each delivery address (e.g., based on an address to latitude and longitude converter), and thus generate at least one latitude and longitude pair for each purchase order. Further, delivery management computing device 102 may obtain from database 116 historical data for the driver over a past time period T, such as the last six months. Assume that the historical data characterizes the delivery of N purchase orders during one or more delivery routes (e.g., a familiarity set F). In some examples, for a given driver, N=|F|>>m. In addition, for each of the N purchase orders, delivery management computing device 102 determines a geographical location (e.g., latitude and longitude) of each delivery address.

For each of the delivery locations in route R, delivery management computing device 102 determines a distance to a nearest location the driver has previously delivered to as indicated by the obtained historical data for the driver. In some examples, delivery management computing device 102 determines the distance by executing a nearest neighbor search over each of the geographical locations of the N purchase orders for each of the geographical locations determined for route R. For example, assuming one delivery address for each of the m purchase orders, m geographical locations are determined. For each of these geographical locations, a nearest neighbor is determined based on the geographical locations determined for the familiarity set F, and a corresponding distance to the nearest neighbor is computed (e.g., in miles, kilometers, feet, etc.). In this example, m distances may be computed (one for each of the m geographical locations). Delivery management computing device 102 may then determine the RF score based on the determined distances.

For example, delivery management computing device 102 may determine a mean distance µ by summing the determined distances and dividing by the number of determined distances (in this example, m determined distances). Delivery management computing device 102 may then determine the RF score based on the distance µ. For example, delivery management computing device 102 may generate the RF scores according to the equation below.

$$\rho = e^{-\mu};  \quad \text{(eq. 1)}$$

The above equation results in RF scores in a range of 0 to 1, inclusive.

Figure 5A:
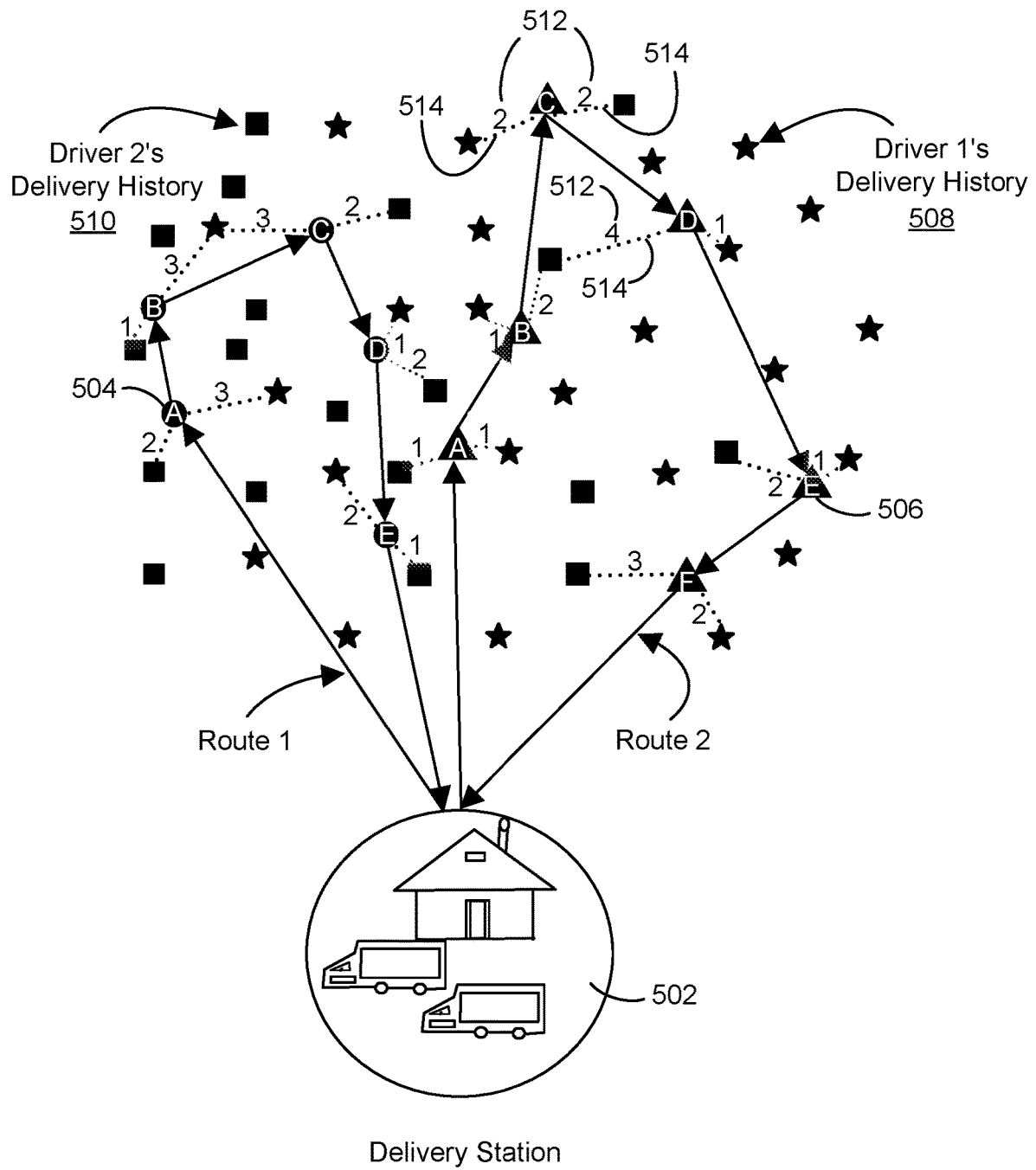
FIG. 5A illustrates delivery routes that may be assigned by the delivery management system of FIG. 1 in accordance with some embodiments.

As an example, FIG. 5A illustrates delivery routes that may be assigned by the delivery management system 100 of FIG. 1. In the illustration, delivery management computing device 102 computes RF scores for two routes, "Route 1" and "Route 2." Route 1 is shown as a closed path of arrows connecting circles 504, and Route 2 is shown as a closed path of arrows connecting triangles 506. The direction of the arrows starting from delivery station 502 constitute the individual delivery routes. Routes 1 and 2 may be generated based on a route planning model, for example.

In addition, there are two drivers, "Driver 1" and "Driver 2." Driver 1's history of delivery locations is shown using stars 508, while Driver 2's history of delivery locations are shown using squares 510. Further, the diagram illustrates computed nearest neighbor distances 512 along dotted lines 514 corresponding to distances (e.g., µ) from each of the delivery locations along each of Route 1 and Route 2 to the historical delivery locations for each of Driver 1 and Driver 2. The distances may be computed in a particular unit, such as meters, kilometers, miles, etc. Each of the distances may be driving distances between locations or, for example, line of sight distances between the locations. The distances may be computed based on any known models, such as algorithms, that compute distances between two locations, such as addresses. In some examples, delivery management computing device 102 determines a latitude and longitude pair for each location (e.g., based on conversion algorithm or conversion lookup table), and determines the distances between locations corresponding to each latitude and longitude pair.

Delivery management computing device 102 may compute the RF scores for each driver-route pair according to equation 1 above. For example, for Driver 1, Route 1, the RF score is computed as $$\rho_{11} = e^{-(3+3+3+1+2)/5} = e^{-\frac{12}{5}} = 0.091.$$

For Driver 1, Route 2, the RF score is computed as $$\rho_{12} = e^{-(1+1+2+1+1+2)/6} = e^{-\frac{4}{5}} = 0.264.$$

Similarly, for Driver 2, Route 1, the RF score is computed as $$\rho_{21} = e^{-(2+1+2+2+1)/5} = e^{-\frac{8}{5}} = 0.202.$$

For Driver 2, Route 2, the RF score is computed as $$\rho_{22} = e^{-(1+2+2+4+2+3)/6} = e^{-\frac{7}{5}} = 0.097.$$

Based on the above computed RF scores, delivery management computing device 102 may determine a driver to route matching that maximizes the sum of the RF scores. For example, delivery management computing device 102 may determine a first sum of RF scores based on assigning Driver 1 to Route 1, and Driver 2 to Route 2. Delivery management computing device 102 may determine a second sum of RF scores based on assigning Driver 1 to Route 2, and Driver 2 to Route 1. Delivery management computing device 102 may determine that the second sum of RF scores is greater than the first sum of RF scores (e.g., the sum of RF scores is maximized under the second sum), and will assign Driver 1 to Route 2 and Driver 2 to Route 1.

Referring back to FIG. 1, in other examples, delivery management computing device 102 may generate RF scores based on a number of delivery locations in a current route with a predetermined number of deliver locations that have nearest neighbors within a predetermined distance. For example, delivery management computing device 102 may determine a percentage of (or a fraction of) delivery locations in a route to be assigned with at least k delivery locations that have nearest neighbors in familiarity set F within a distance A (e.g., A meters).

As an example, delivery management computing device 102 may determine the below equation:

$$N\!N(F,p) = \min_{q \in F} \{\text{dist}(p,q)\}; \quad \text{(eq. 2)}$$

In other words, N N (F, p) takes as input a set of coordinates F and a delivery location, e.g., latitude and longitude data pair p, on a route R, e.g., p∈R, and returns the distance of the nearest neighbor of p in F. Delivery management computing device 102 may then compute the RF score according to the equation below:

$$RF\ Score = (\Sigma_{1 \leq i \leq n}(N\ N(F,p_i) \leq \lambda))/m; \qquad (eq.\ 3)$$

In equation 3 above, $p_i \in R$ is a delivery location. The quantity $(N\ N\ (F, p_i) \leq \lambda)$ is a predicate which is one value (e.g., 1) when the condition is satisfied, and a second value (e.g., 0), when the condition is not satisfied. Based on these equations, the RF score would result in a value between 0 and 1, inclusively.

For example, with reference to FIG. 5A and assuming $\lambda=2$, delivery management computing device 102 would compute the RF scores $\rho_{11}=0.4$ (for Driver 1, Route 1), $\rho_{12}=1$ (for Driver 1, Route 2), $\rho_{21}=1$ (for Driver 2, Route 1), and $\rho_{22}=0.67$ (for Driver 2, Route 2).

Based on these computed distances, delivery management computing device 102 may further determine a matching that maximizes the sum of the above RF scores as described above, and assign Driver 1 to Route 2 and Driver 2 to Route 1.

Although the RF scores in these examples are scaled to a value between 0 and 1 inclusively, any scaling may be employed (e.g., 0 to 100). Further, in some examples, delivery management computing device 102 determines a number of visits to each historical location, and weights the distance to each historical location based on the number of visits. For example, a historical location that a driver has visited more frequently within the past T time period may be weighted more heavily than another historical location that the driver has not visited as frequently over the same time period T. In some other examples, additionally, customer feedback on the delivery performance of a driver may be utilized to compute the RF scores. For example, customer feedback assigning the driver a higher level of satisfaction (e.g., 10 on a scale of 0 to 10) may correspond to assigning more weight to the corresponding delivery location, while a lower level of satisfaction (e.g., 0 on the same scale) may correspond to assigning less weight to the corresponding delivery location.

Referring back to FIG. 1, in some examples, delivery management computing device 102 determines the RF scores based on the application of one or more machine learning models (e.g., algorithms), such as one based on linear regression, logistic regression, random forest, gradient boosting, or a neural network. The machine learning model may operate on features generated from each driver's historical routes. Further, the machine learning models may be trained based on historical route data for a plurality of drivers.

In some examples, the historical route data includes a rating for each route. For example, after the execution of each route, a driver may be prompted by an application that executes on customer computing device 110, 112, 114, to rate the route based on route familiarity and/or delivery experience. As an example, the application may allow the driver to rate the route on a scale of 1 to 10, where 10 represents a most familiar route and 1 represents a least familiar route. In some examples, the application may allow the driver to rate the route's experience on a scale of 1 to 10, where 10 represents a most enjoyable route, and 1 represents a least enjoyable route. Delivery management computing device 102 may generate features from the ratings, and apply a trained machine learning model to the generated features to determine RF scores.

By way of example, the machine learning model may be trained on a plurality of data sets. For example, delivery management computing device 102 may aggregate within a data repository, such as database 116, historical route data (e.g., driver's historical routes, customer feedback ratings, driver's own ratings of previous routes) over a period of time (e.g., the past 13 months) for each driver. To train the machine learning model, the aggregated historical route data is partitioned into a plurality of time horizons. For example, assuming the aggregation of historical route data for 13 months, the historical route data is partitioned for a first time period (e.g., the most recent month) denoted by $T_1$, and a second time period (e.g., the first 12 months of the 13 month period), denoted by $T_2$. Delivery management computing device 102 may then generate features as described herein for each time period, $T_1$, $T_2$, based on the corresponding historical route data. The features generated for the time period $T_1$ may be used as the target/response features (e.g., expected outcome, output features) when training the machine learning model (e.g., supervised training), while the features generated for the time period $T_2$ may be used as input training features during the training. For example, the machine learning model is trained to learn to generate the $T_2$ time period features based on receiving as input the $T_1$ time period features (e.g., the machine learning model learns to map the $T_2$ time period features to the $T_1$ time period features). In other words, delivery management computing device 102 determines a mapping of a first set of features (e.g., $T_2$ features) to the second set of features (e.g., $T_1$ features).

In some examples, a utility function may be applied to the features generated for the time period $T_1$ to quantify a familiarity of each driver (e.g., a target outcome) that may be employed as an RF score. For example, the utility function may characterize a weighted combination of one or more features corresponding to each driver, such as each driver's own rating, customers' rating, and corresponding historical delivery routes (e.g., such as corresponding µ values, which may be computed by summing determined distances and dividing by the number of determined distances, as described herein), and in some examples may be averaged during the time period $T_1$ to generate one or more features. As an example, the utility function may be defined as follows to quantify an RF score:

$$y = \beta_1 * y_1 + \beta_2 * y_2 + \beta_3 * y_3); \qquad (eq.\ 4)$$

where:
$\beta_1$, $\beta_3$, $\beta_3$ are constants;
$y_1$=average driver ratings over $T_1$,
$y_2$=average customer ratings of the driver over $T_1$; and
$y_3$=average µ values over all the routes the driver has driven over $T_1$.

The constants $\beta_1$, $\beta_3$, $\beta_3$ can, in some examples, be chosen suitably using heuristic methods and/or parameter optimization techniques that improve the driver's overall familiarity of a route. Additionally, indirect measurements such as on-time delivery accuracy, or an amount of free time available in a delivery route, can be determined and used as performance measures to tune these constants to drive optimal performance. For example, an increase in free time available for a particular delivery route may indicate that the driver is becoming more familiar with that route.

In some examples, the features generated over the time period $T_2$ are aggregated according to feature type, such as driver's average ratings, number of routes driven, number of deliveries made, average customers' rating, and the historical µ values. In some examples, the features generated over the time period $T_2$ are aggregated over several time periods within time period $T_2$, such as within 1, 2, 4, 6, 8, 10, 12 months that are part of $T_2$. For example, the features may be computed over period $T_2$, doing aggregations such as the driver's average ratings ($x_{1j}$), average rating by customers ($x_{2j}$), and historical $\mu$ values over all routes a driver has driven ($x_{3j}$), number of routes driven ($x_{4j}$), and number of deliveries made ($x_{5j}$), over different time horizons, e.g., over j=1, 2, 4, 6, 8, 10, 12 past months that are part of the $T_2$ time period. The $T_2$ input features may be used to train a supervised learning model that may be based on, for example, linear regression, random forest, gradient boosting, or a neural network. For example, the target y is defined (e.g., based on equation 4 above) to quantify an RF score over the time horizon $T_1$ which is used as the target/response variable, and input features over the time horizon $T_2$ are employed to train a supervised machine learning model that may be based on, for example, linear regression, random forest, gradient boosting, or a neural network. Based on the training, the model learns the following mapping:

$$y = f(x_{1j}, x_{2j}, x_{3j}, x_{4j}, x_{5j})). \quad \text{(eq. 5)}$$

Here, $x_{ij}$ for i∈{1, 2, 3, 4, 5} and j∈{1, 2, 4, 6, 8, 10, 12}, are the features described above, and y is the target/response variable quantifying the RF score. The supervised machine learning model learns the function f that maps the features to the response variable quantifying the RF score. Once trained on the generated features (e.g., using $T_2$ time period features as input features and $T_1$ time period features for target features), the trained machine learning model may be employed to generate RF scores as described herein.

In some examples, the machine learning model is trained based on a fixed training schedule, for example, daily, twice in a week, monthly, or quarterly. The occasional or periodic training of the machine learning model may ensure that the most recent route engagement history (e.g., historical route data) is used to predict the RF scores between drivers and the routes.

Figure 5B:
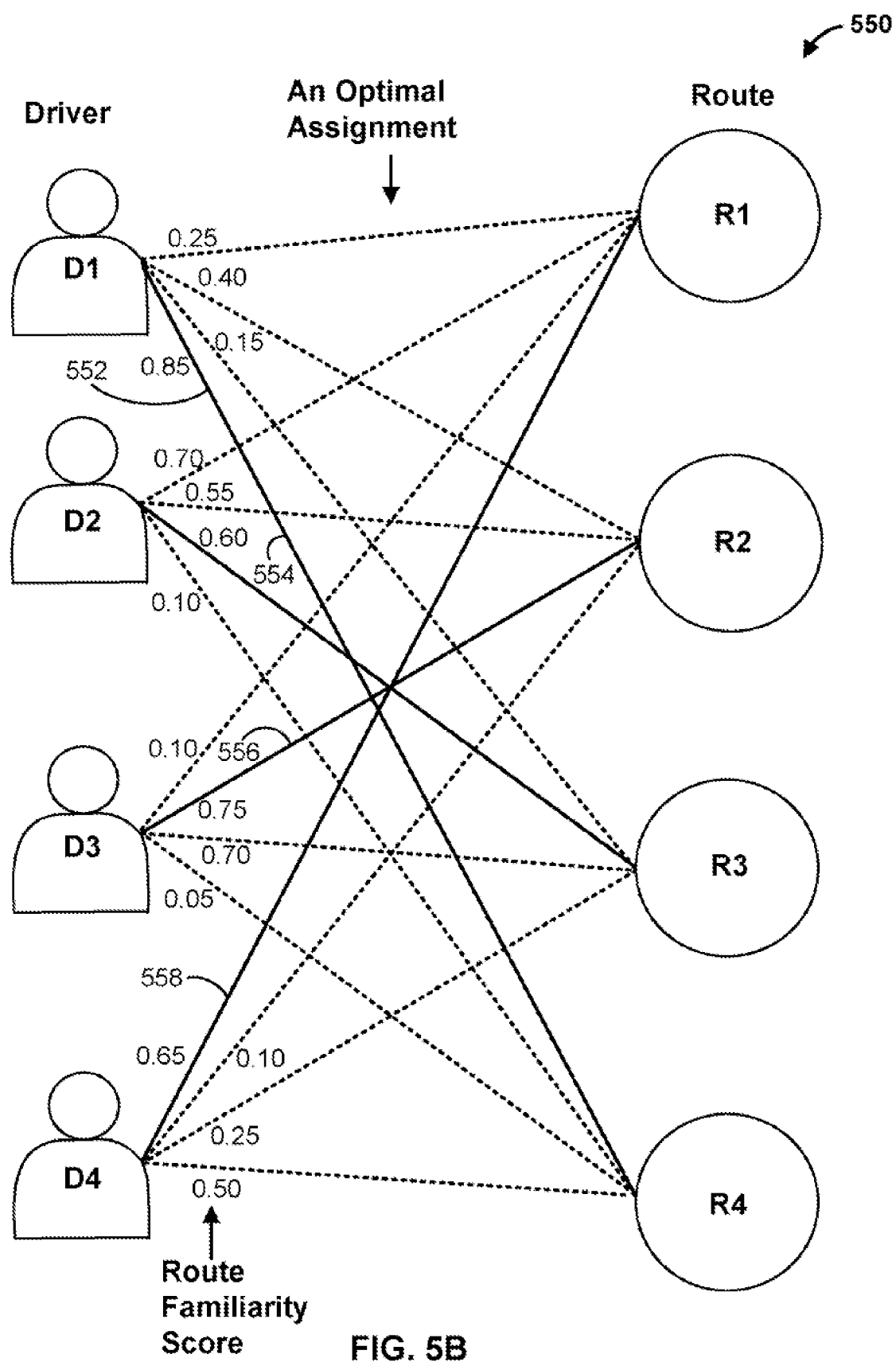
FIG. 5B illustrates delivery route assignments that may be assigned by the delivery management system of FIG. 1 in accordance with some embodiments.

In some examples, delivery management computing device 102 may determine a maximal matching that maximizes the sum of RF scores by modeling a bipartite graph. For example, FIG. 5B illustrates a graph 550 that matches drivers D1, D2, D3, and D4 to routes R1, R2, R3, and R4. As illustrated, bipartite graph 550 includes edges between each driver D1, D2, D3, and D4 and each route R1, R2, R3, and R4, where each edge is associated with a computed RF score (e.g., a computed weight of each edge). In other words, for a driver i with RF score $\rho_{ij}$ for a route j, there is an edge in the graph between vertices i and j with weight $\rho_{ij}$. For example, driver D1 has an RF score of 0.15 for route R3, and has an RF score of 0.85 for route R4.

To maximize the sum of RF scores and determine a matching of drivers D1, D2, D3, and D4 to routes R1, R2, R3, and R4, delivery management computing device 102 may employ a bipartite graph model such that G=(U=Drivers, V=Routes, E=EdgesWith RFScores), with |U|=|V|=n, where a perfect matching is defined according to M ⊂ E as a one-to-one and on-to relation (bijection), that is, each i∈U matches with a vertex j ∈ V. The matching may be determined according to the below equations.

$$\text{maximize} \Sigma_{j \in V} \chi_{ij} = 1 \text{ for } j \in U; \quad \text{(eq. 6)}$$

subject to:

$$\Sigma_{j \in V} x_{ij} = 1 \text{ for } i \in U; \quad \text{(Eq. 7)}$$

$$\Sigma_{i \in U} x_{ij} = 1 \text{ for } j \in V; \quad \text{(eq. 8)}$$

and $$\chi_{ij} \in \{0,1\} \subset \mathbb{Z} \text{ for } i \in U, j \in V; \quad \text{(eq. 9)}$$

where:

$\chi_{ij}=1$ if $\rho_{ij}$ is included in the solution M, otherwise $\chi_{ij}=0$.

Here the objective is to choose a perfect matching such that the sum of the RF scores is maximized. In some examples, delivery management computing device 102 employs the Kuhn-Munkres algorithm, which is one of the methods of solving the maximum bipartite graph matching problem described by equations 6-9. Referring back to FIG. 5B, the sum of the RF scores (i.e., as indicated on the edges) is maximized, thereby producing an optimal route, when driver D1 is assigned to route R4 (as indicated by bold edge 552), driver D2 is assigned to route R3 (as indicated by bold edge 554), driver D3 is assigned to route R2 (as indicated by bold edge 556), and driver D4 is assigned to route R1 (as indicated by bold edge 558).

Referring back to FIG. 1, in some examples, delivery management computing device 102 obtains route preference data for a driver. The route preference data may identify route preferences for the driver, such as geographical areas they prefer to deliver items to, or geographical areas they do not want to deliver items to. Delivery management computing device 102 may adjust driver to route assignments based on the route preference data. For example, delivery management computing device 102 may eliminate an edge between a driver and a route if route preference data for the driver indicates the driver prefers not to visit a geographical area associated with the route. In some examples, delivery management computing device 102 may adjust (e.g., weight, scale) an RF score based on the route preference data for the driver. For example, if the driver prefers to visit a geographical area associated with a route, delivery management computing device 102 may upwardly adjust the RF score associated with the route. If, however, the driver prefers to avoid the geographical area associated with a route, delivery management computing device 102 may downwardly adjust the RF score associated with the route.

In some examples, delivery management computing device 102 assigns drivers (e.g., drives of pool of delivery vehicles 120) to routes occasionally, such as nightly, weekly, or monthly. In some examples, delivery management computing device 102 assigns drives based on what shift each driver works. For example, delivery management computing device 102 may assign a first subgroup of drivers that work during a first shift (e.g., a 7 am to 3 pm shift) to a first set of routes (e.g., routes to deliver items during the first shift). Similarly, delivery management computing device 102 may assign a second subgroup of drivers that work during a second shift (e.g., a 3 μm to 11 pm shift) to a second set of routes (e.g., routes to deliver items during the second shift). In addition, delivery management computing device 102 may assign a third subgroup of drivers that work during a third shift (e.g., a 11 pm to 7 am shift) to a third set of routes (e.g., routes to deliver items during the third shift). Although described herein with respect to deliveries, in some examples, the delivery management system can be also be applied when picking items up from customers (e.g., returns) and/or sellers (e.g., pickup from third-party sellers).

In some examples, delivery management computing device 102 may execute an exploration-exploitation of driver assignment by keeping, for example, a percentage (e.g., 90 percent) of the assignments to their greatest (e.g., optimal) RF scores and randomly shuffling the rest (e.g., 10 percent) of the assignments. This may allow drivers who are experts in delivering in certain geographies (e.g., those with higher RF scores in the certain geographies) to continue to do so, while still allowing drivers, such as those who are new or may be willing to explore alternative geographies, to be assigned to other routes. As these drivers gain experience with certain routes, they gain expertise over these routes. As they build experience, they may be assigned to those routes over the geographies that they have developed expertise on.

Among other advantages, the above explore-exploit method may solve the cold-start problem of assigning a route to a new driver. In some examples, delivery management computing device 102 allows RF scores to be updated or adjusted by a user. In this manner, an RF score for a new driver that has prior experience or preference of a certain geography may be adjusted.

Although the above examples delivery management computing device 102 determines the driver to route matching based on maximizing a sum of RF scores, delivery management computing device 102 may employ any suitable model (e.g., algorithm) to determine the matching.

In addition, the above exemplary route matching may be employed in various use cases. For example, the driver RF score computation and route assignment mechanism described herein may be applicable, mutatis mutandis, when the drivers are third party contract drivers or part-time drivers including crowd-sourced deliveries. The mechanisms may also be applicable to aerial route assignments (e.g., drone deliveries) and in-water delivery route assignments (e.g., boat deliveries). Further, in some examples, the driver to route matching described herein may be employed to determine a substitute driver, such as when one driver is unavailable for a route assignment. For example, assuming a first driver is unavailable for a route assignment, the driver to route matching mechanisms may be employed to assign a second driver to the first driver's route. Additionally, in some examples, the driver to route assignment mechanisms described herein are applicable to in-store environments for grocery or general merchandise picking tasks, such as assigning pickers to collect and bag purchased items. For example, during the order fulfilment process, the mechanisms described herein may be employed to assign one or more pickers to pick entire or parts of orders based on their familiarity of the organization of the items in the store (e.g., familiarity with aisles, store areas such as produce, meats, etc.). As an example, a first picker may have more experience with picking items from the Health, Beauty & Pharmacy department, and Office, Crafts, & Party Supplies department, while a second picker may be more familiar with picking items from the Meat department, Fruits & Vegetables department, and Deli & Freshly Prepared Meals department. The mechanisms described herein may assign the first picker and second picker to pick items for one or more orders based on historical picking data characterizing their experiences. In some examples, delivery management computing device 102 aggregates the historical picking data for each picker across one or more stores, such as when a picker has picked items in multiple stores, and generates RF scores as described herein based on the aggregated historical picking data.

Figure 2:
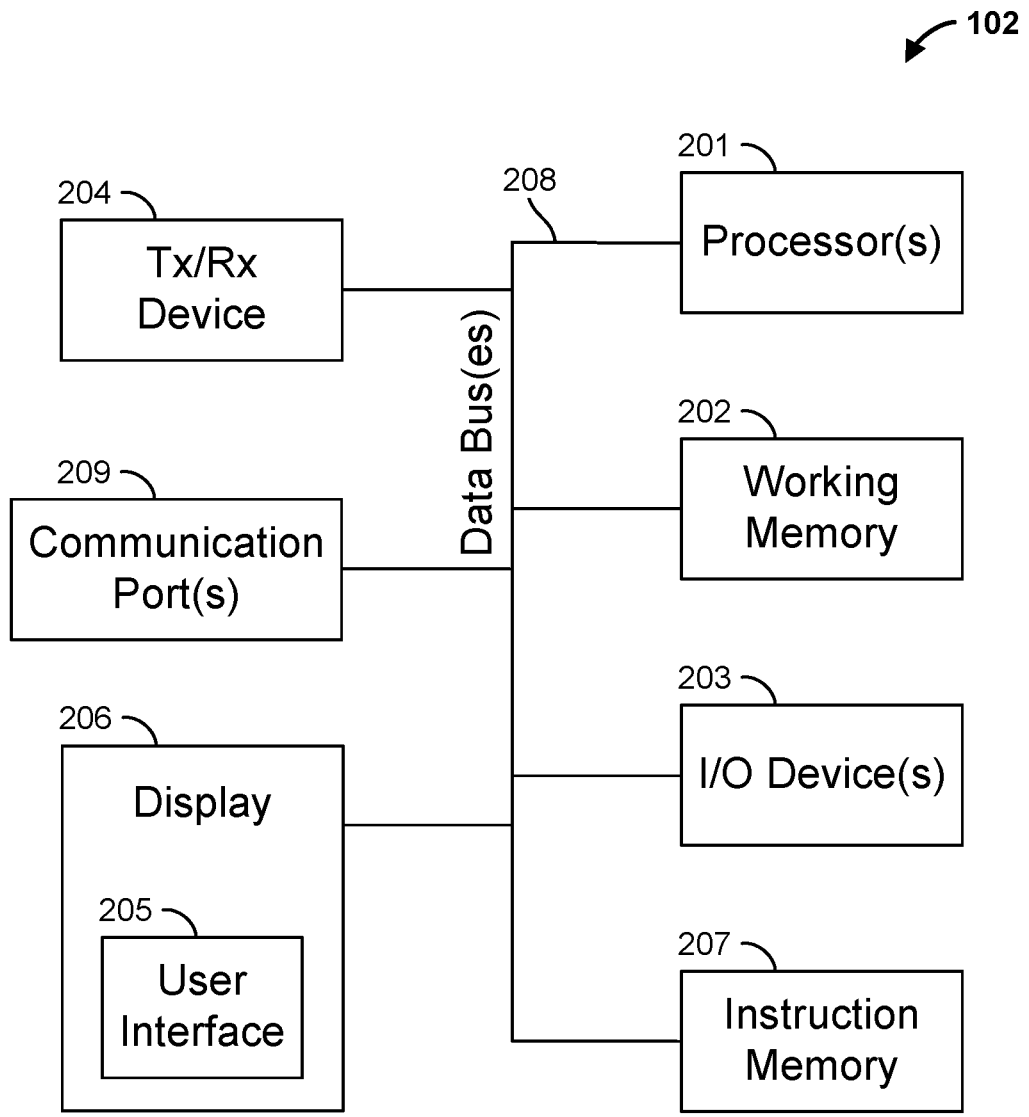
FIG. 2 is a block diagram of a delivery management computing device in accordance with some embodiments.

FIG. 2 illustrates an example of the delivery management computing device 102 of FIG. 1. Delivery management computing device 102 can include one or more processors 201, working memory 202, one or more input/output devices 203, instruction memory 207, a transceiver 204, one or more communication ports 209, and a display 206 with a user interface 205, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. Processors 201 can be configured to perform a certain function or operation by executing code, stored on instruction memory 207, embodying the function or operation. For example, processors 201 can be configured to execute code stored in instruction memory 207 to perform one or more of any function, method, or operation disclosed herein.

Additionally, processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of delivery management computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as historical route data.

Display 206 can be any suitable display, and may display user interface 205. User interfaces 205 can enable user interaction with delivery management computing device 102. For example, user interface 205 can be a user interface for an application of a retailer that allows a customer to view and interact with a retailer's website. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 delivery management computing device 102 will be operating in. Processor(s) 201 is operable to receive data from, or send data to, a network, such as communication network 118 of FIG. 1, via transceiver 204.

Figure 3:
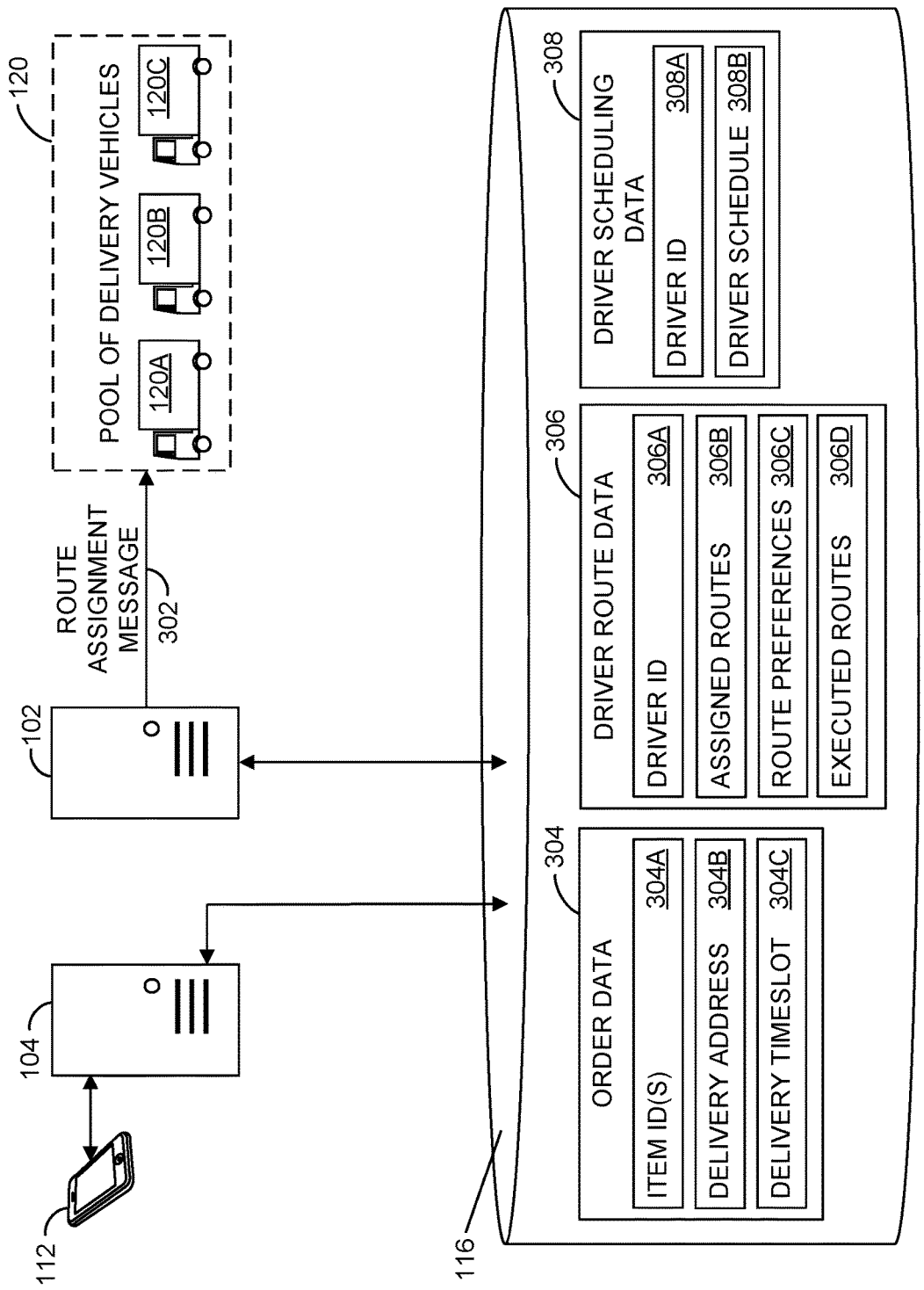
FIG. 3 is a block diagram illustrating various portions of the delivery management system of FIG. 1 in accordance with some embodiments.

FIG. 3 is a block diagram illustrating examples of various portions of the delivery management system 100 of FIG. 1. In this example, web server 104 receives orders from one or more customers via one or more customer computing devices, such as customer computing device 112. For example, web server 104 may host a retailer's website that allows for the purchase of items, such as grocery items, household items, or outdoor items. A customer, via customer computing device 112, may access the website, and place an order for one or more items. In some examples, the website allows the customer to provide delivery options. For example, the website may allow the customer to select a delivery time or time range (e.g., time slot), as well as a delivery address, for delivery of the purchased items. Web server 104 may receive order data 304 characterizing and identifying each purchase order, and may store order data 304 in database 116. Order data 304 may include, for example, an item identifier (ID) 304A for each item purchased, a delivery address 304B for delivery of the purchased items, and a delivery timeslot 304C identifying a day and time or time range to deliver the purchased items.

Database 116 further stores driver route data 306 and driver scheduling data 308. Driver scheduling data 308 may include a driver ID 308A identifying each driver, and a driver schedule 308B for each driver. The driver schedule 308B may characterize a working schedule for a driver, such as by identifying which days and times the driver is scheduled to work (e.g., for delivery of purchase orders). In some examples, the working schedule 308B identifies a shift during which the driver is scheduled to work. The drivers may work by driving delivery vehicles, such as a delivery vehicle from the pool of delivery vehicles 130, to deliver purchase orders.

Driver route data 306 may include a driver ID 306A, assigned routes 306B, route preferences 306C, and executed routes 306D for each driver. The driver ID 306A identifies the driver, and, in some examples, may be the same as driver ID 308A. Executed routes 306D characterizes and identifies previous routes the driver (as identified by driver ID 306A) has taken to deliver purchase orders. For example, executed routes 306D may include delivery locations for each previous route. In some examples, the delivery locations include a latitude and longitude computed by delivery management computing device 102 from a delivery address. Executed routes 306D may include previous routes taken by the driver over a temporal period, such as over the last six months, a year, five years, etc. In some examples, executed routes 306D includes location coordinates and timestamps of each stop of a previous route, time to walk to a customer's doorstep, delivery scans, customer reviews of the driver, a driver's own notes, and images that may have been captured at each delivery stop.

Assigned routes 306B characterize and identify routes (e.g., current routes) that the driver is assigned to (e.g., routes the driver has not yet begun, or is in the process of executing). For example, assigned routes 306B may include one or more routes assigned to the driver, where each route is to be delivered based on the driver's driver schedule 308B (e.g., during a day and time or time range that the driver is working). As an example, assigned routes 306B may include, for a corresponding driver, a first route for deliveries on Monday, a second route for deliveries on Tuesday, a third route for deliveries on Wednesday, a further route for deliveries on Thursday, and a fifth route for deliveries on Friday. Because the driver is not scheduled to work on Saturday and Sunday (e.g., based on the driver's driver schedule 308B), there are no routes scheduled for the driver on those days.

Delivery management computing device 102 may further determine a driver schedule 308B for each driver based on, for example, determining RF scores for each available driver and available route, and maximizing the sum of the determined RF scores to determine a route assignment for each driver. For example, delivery management computing device 102 may determine a plurality of routes for deliveries that need to be delivered during a particular timeslot (e.g., 9 am to 11 am) on a particular day (e.g., Saturday). Based on driver schedules 308B, delivery management computing device 102 determines a pool of available drivers that are scheduled to work on the particular timeslot on the particular day.

Further, delivery management computing device 102 generates an RF score for each driver from the determined pool of available drivers and route from the plurality of routes (e.g., for each driver-route pair). The RF scores may be generated in accordance with equation 1 or equation 3 above, or using one or more supervised machine learning models that learn the function described in equation 5 above, for example. In some examples, delivery management computing device 102 adjusts the RF scores based on route preferences 306C for each driver. For example, delivery management computing device 102 may scale up (e.g., apply a predetermined percentage such as 120% but capping at an RF maximum value) an RF score for a driver that prefers a corresponding route, and may scale down an RF score (e.g., minimize, apply a predetermined percentage such as 30%) for a driver that would rather not work a corresponding route. In some examples, in cases where a driver is newly recruited, the system may assign a score based on route preferences 306C, which may identify the driver's own knowledge of a delivery area, such as geography and familiarity (e.g., a cold-start problem).

Based on the determined RF scores, delivery management computing device 102 assigns each of the drivers from the pool of available drivers to a route from the plurality of routes. For example, delivery management computing device 102 may determine the assignments based on maximizing the sum of the determined RF scores according to equations 6-9 as described herein. Delivery management computing device 102 may store the assigned route for each driver in database 116 as assigned route 306B. In some examples, delivery management computing device 102 packages assigned route 306B within a route assignment message 302 for transmission to each corresponding driver, and transmits the route assignment message 302 to a driver of a delivery vehicle 120A, 120B, 120C. In some examples, route assignment message 302 is a route manifest that may be displayed by a computing device of the driver.

Figure 4:
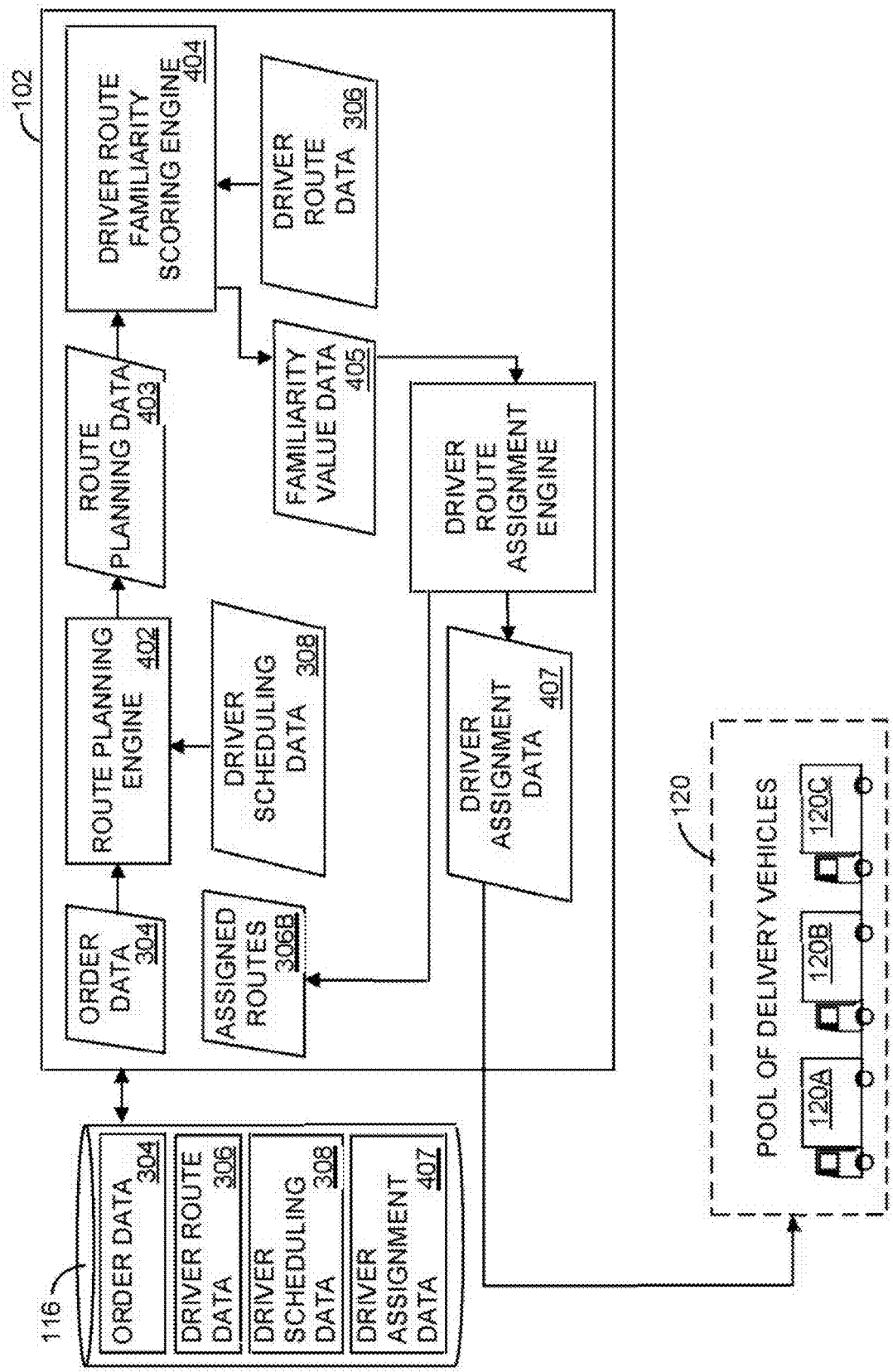
FIG. 4 is a block diagram illustrating various portions of the delivery management system of FIG. 1 in accordance with some embodiments.

FIG. 4 illustrates exemplary portions of the delivery management system 100 of FIG. 1. In this example, delivery management computing device 102 includes route planning engine 402, driver route familiarity scoring engine 404, and driver route assignment engine 406. In some examples, one or more of route planning engine 402, driver route familiarity scoring engine 404, and driver route assignment engine 406 may be implemented in hardware. In some examples, one or more of route planning engine 402, driver route familiarity scoring engine 404, and driver route assignment engine 406 may be as an executable program maintained in a tangible, non-transitory memory, such as instruction memory 207 of FIG. 2, that may be executed by one or more processors, such as processor 201 of FIG. 2.

Route planning engine 402 is operable to obtain order data 304 from database 116, and determine delivery routes to deliver purchase orders identified by order data 304. For example, route planning engine 402 may group the purchase orders into batches based on corresponding delivery times (or delivery time slots) and delivery location proximities, and generate one or more delivery routes for one or more delivery vehicles 120A, 120B, 120C for each of the times (or delivery time slots). Route planning engine 402 may apply any delivery or route planning model, such as one or more route planning algorithms, as is known in the art, to generate delivery routes. Each delivery route may include a delivery location for each purchase order. In some examples, route planning engine 402 aggregates orders for each route such that the purchase orders assigned to the delivery route may be delivered within the corresponding time or time slot.

Further, route planning engine 402 obtains driver scheduling data 308 from database 116, and determines a set of drivers that are available to make the deliveries during the time or time windows. For example, route planning engine 402 may include drivers that are scheduled to work during the delivery time or time window, and exclude those drivers that are not scheduled to work during the delivery time or time window.

Route planning engine 402 generates route planning data 403 identifying the determined routes (including the delivery locations for each route), and the available drivers.

Driver route familiarity scoring engine 404 receives route planning data 403 from route planning engine 402, and further obtains driver route data 306 for each driver identified by route planning data 403 from database 116. Driver route familiarity scoring engine 404 determines familiarity values based on the route planning data 403 and driver route data 306, and generates familiarity value data 405 identifying the generated familiarity values. Specifically, driver route familiarity scoring engine 404 generates a set of familiarity values for each driver identified by route planning data 403, where each familiarity value corresponds to one of the routes identified by route planning data 403. Driver route familiarity scoring engine 404 generates the familiarity values based on the driver route data 306 obtained for each driver.

For example, driver route familiarity scoring engine 404 may obtain driver route data 306 for each driver identified in the received route planning data 403, where the driver route data 306 includes route preferences 306B and executed routes 306D for each driver. Further, driver route familiarity scoring engine 404 may generate familiarity values (e.g., RF scores) based on the delivery locations for each of the delivery routes identified by route planning data 403, and on the delivery locations identified by executed routes 306D, for each of the drivers. As an example, driver route familiarity scoring engine 404 may determine the familiarity values in accordance with equation 1, or equation 3, or using one or more supervised machine learning models that learn the function described in equation 5, above.

In some examples, driver route familiarity scoring engine 404 adjusts the familiarity values based on the route preferences 306B for each driver. For example, driver route familiarity scoring engine 404 may increase, or decrease, a familiarity value for a driver based on preference values identified by route preferences 306B for the driver.

Driver route familiarity scoring engine 404 generates familiarity value data 405 identifying each familiarity value and corresponding driver-route pair (e.g., the driver and delivery route corresponding to the familiarity value), and transmits familiarity value data 405 to driver route assignment engine 406.

Driver route assignment engine 406 receives familiarity value data 405 from driver route familiarity scoring engine 404, and assigns each driver to a route based on the familiarity values. For example, driver route assignment engine 406 may execute an algorithm in accordance with equations 6-9 to determine the driver to route assignments based on maximizing a sum total of the familiarity values, such as in accordance with a bipartite graph model (e.g., equations 6-9 above). Driver route assignment engine 406 generates assigned routes 306B for each driver, and stores assigned routes 306B within database 116. In some examples, driver route assignment engine 406 packages assigned routes 306B within a message for transmission to another computing device, such as a computing device of a corresponding driver. For example, driver route assignment engine 406 may package assigned routes 306B within driver assignment data 407, and transmit driver assignment data 407 to the assigned driver.

Figure 6A:
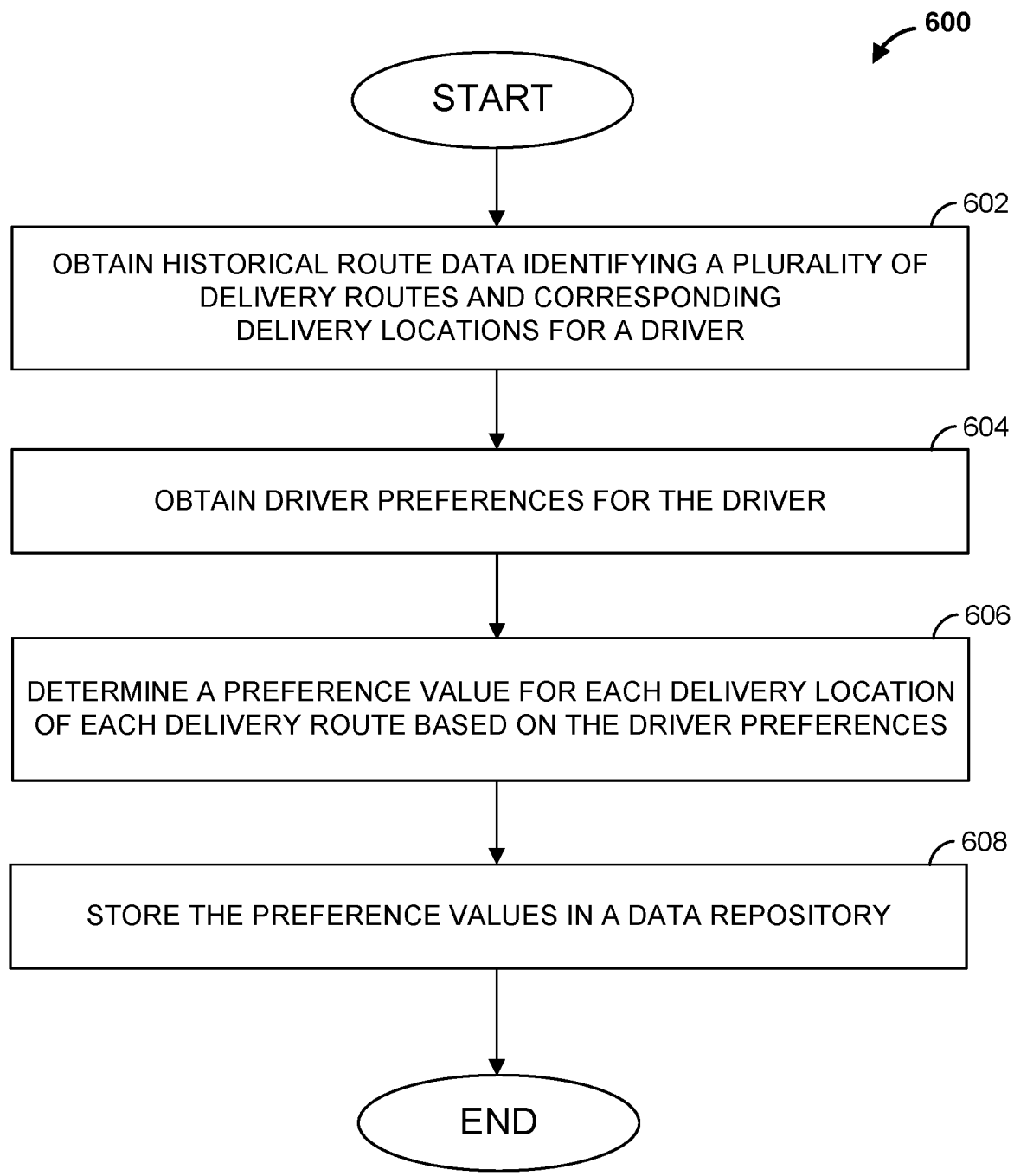
FIG. 6A is a flowchart of an example method that can be carried out by the delivery management system of FIG. 1 in accordance with some embodiments.

FIG. 6A is a flowchart of an example method 600 that can be carried out by a computing device, such as the delivery management computing device 102 of FIG. 1. Beginning at step 602, historical route data for a driver is obtained. The historical route data identifies a plurality of delivery routes and corresponding delivery locations. For example, delivery management computing device 102 may obtain executed routes 306D from database 116 for the driver. At step 604, driver preferences for the driver are obtained. For example, delivery management computing device 102 may obtain route preferences 306C from database 116 for the driver.

Proceeding to step 606, a preference value is determined for each delivery location of each of the plurality of delivery routes based on the driver preferences. For example, the driver preferences may indicate that a driver does not want to deliver in a first geographical area (e.g., as defined by a zip code, a town, a range of latitude and longitude ranges, etc.). Based on the driver wanting to avoid the first geographical area, delivery management computing device 102 may determine a first preference value for any delivery location within the first geographical area. The driver preferences may also indicate that the driver prefers (e.g., enjoys) delivering in a second geographical area. Based on the driver wanting to deliver in the second geographical area, delivery management computing device 102 may determine a second preference value for any delivery location within the second geographical area.

The preference values may be applied to RF scores to adjust the RF scores. For example, application of the first preference value, when applied to an RF score, may tend to generate a reduced RF score. Application of the second preference value, when applied to an RF score, may tend to generate an increased RF score. For example, the first preference value may range in value from 0 up to 1 (e.g., 0% to 100%), while the second preference value may range in value from 1 up to a maximum value, such as 2 (e.g., 100% up to and including 200%).

At step 608, the preference values are stored in a data repository, such as database 116. The preference values may be stored for each driver. For example, the preference values may be stored within route preferences 306C associated with driver ID 306A for each driver. Delivery management computing device 102 may obtain the preference values from the data repository to adjust RF scores for corresponding drivers, for example. The method then ends.

Figure 6B:
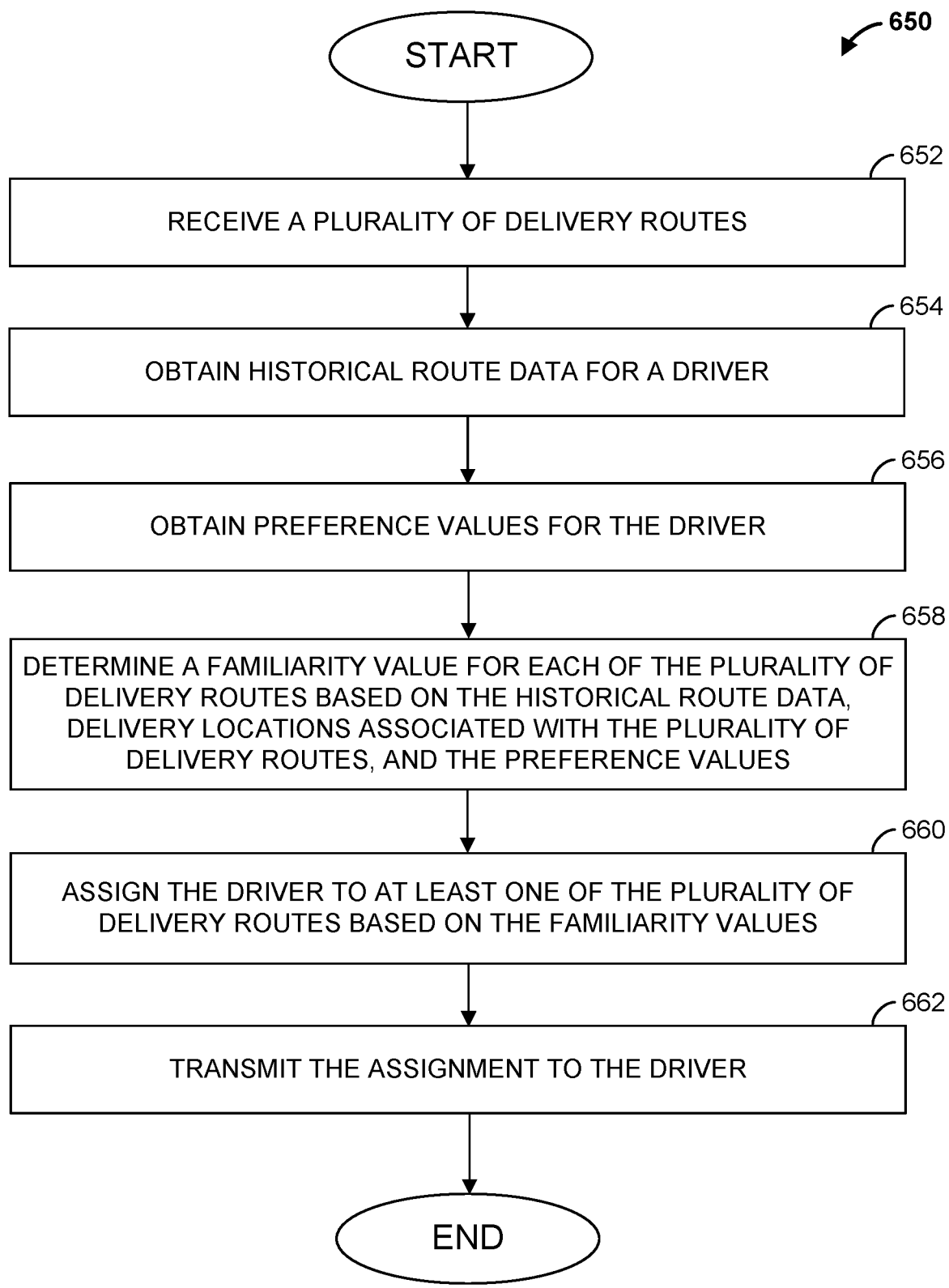
FIG. 6B is a flowchart of another example method that can be carried out by the delivery management system of FIG. 1 in accordance with some embodiments.

FIG. 6B is a flowchart of an example method 650 that can be carried out by a computing device, such as the delivery management computing device 102 of FIG. 1. Beginning at step 652, a plurality of delivery routes are received. For example, delivery management computing device 102 may receive the plurality of delivery routes from a route planning system. In some examples, delivery management computing device 102 obtains the plurality of delivery routes from a database, such as database 116. In some examples, delivery management computing device 102 generates the plurality of delivery routes (e.g., via route planning engine 402). At step 654, historical route data for a driver is obtained. For example, delivery management computing device 102 may obtain executed routes 306D from database 116 for the driver. At step 656, preference values for the driver are obtained. The preference values may have been generated in accordance with method 600 of FIG. 6A, for example, and may be obtained from database 116 (e.g., route preferences 306C).

Proceeding to step 658, a familiarity value for each of the plurality of delivery routes for the driver is determined based on the historical route data, delivery locations associated with each corresponding delivery route, and the preference values. For example, delivery management computing device 102 may compute an RF score for each of the plurality of routes for the driver based on determining distances from each delivery location of a corresponding delivery route to delivery locations of historical routes taken by the driver, as identified by the historical route data. The RF scores may be computed in accordance with equation 1 or equation 3, or using one or more supervised machine learning models that learn the function described in equation 5, above, for example. Further, delivery management computing device 102 may adjust the computed RF scores (e.g., increase, or decrease, the RF scores) based on preference values corresponding to each delivery location of the historical routes taken by each driver.

At step 660, the driver is assigned to at least one of the plurality of delivery routes based on the familiarity values. For example, delivery management computing device 102 may assign the driver to a delivery route based on maximizing a sum of RF scores for the driver and RF scores generated for other drivers for the same plurality of delivery routes. For example, delivery management computing device 102 may determine the assignment in accordance with equations 6-9.

Proceeding to step 662, the route assignment is transmitted to the driver. For example, delivery management computing device 102 may transmit the route assignment to a computing device of the driver. The method then ends.

Figure 7:
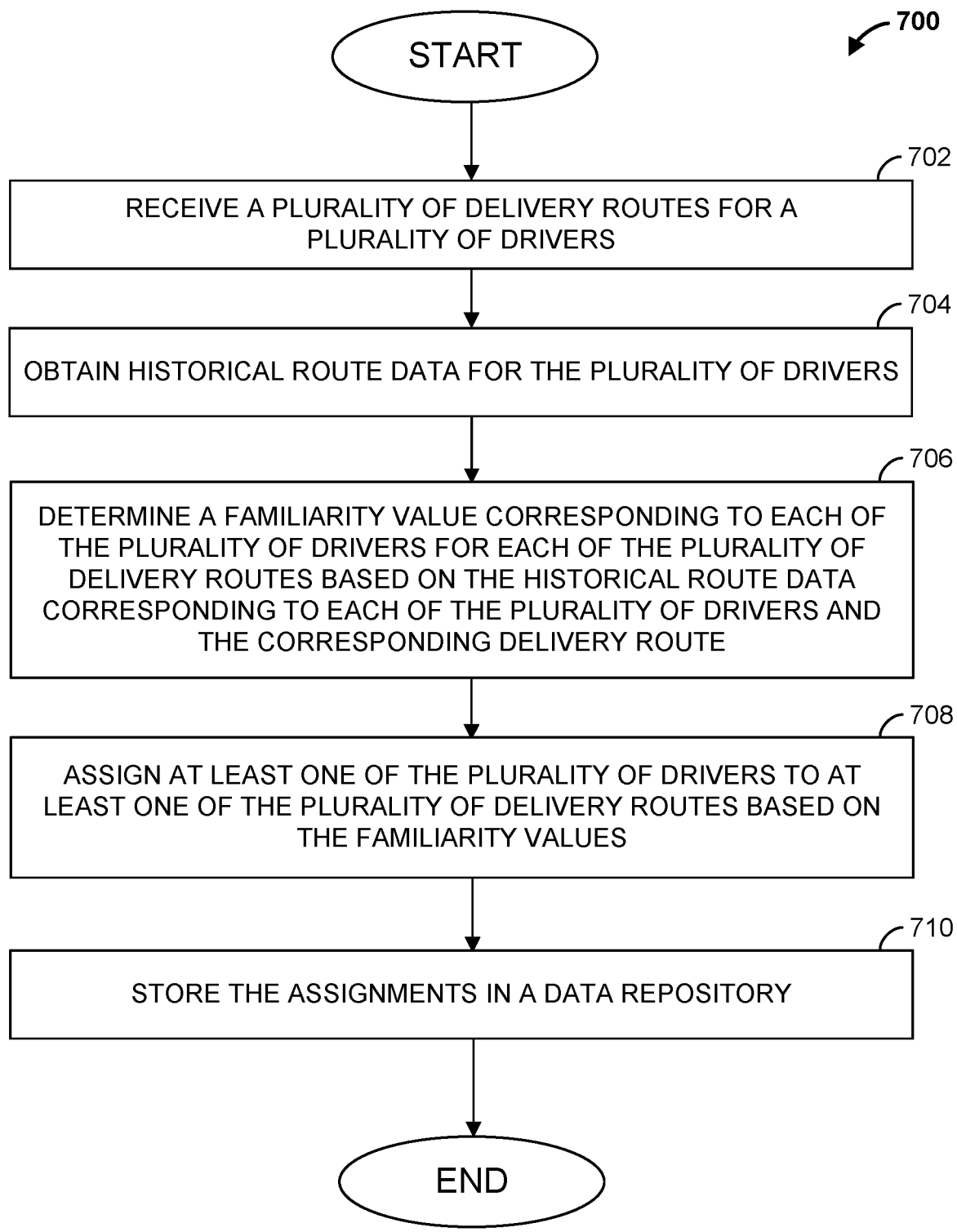
FIG. 7 is a flowchart of yet another example method that can be carried out by the delivery management system of FIG. 1 in accordance with some embodiments.

FIG. 7 is a flowchart of an example method 700 that can be carried out by a computing device, such as the delivery management computing device 102 of FIG. 1. Beginning at step 702, a plurality of delivery routes for a plurality of drivers are received. For example, delivery management computing device 102 may receive the plurality of delivery routes from a route planning system. In some examples, delivery management computing device 102 obtains the plurality of delivery routes from a database, such as database 116. In some examples, delivery management computing device 102 generates the plurality of delivery routes (e.g., via route planning engine 402). At step 704, historical route data for the plurality of drivers is obtained. For example, delivery management computing device 102 may obtain, from database 116, executed routes 306D for each of the plurality of drivers.

Proceeding to step 706, a familiarity value corresponding to each of the plurality of drivers for each of the plurality of delivery routes is determined. The determination is made based on the historical route data corresponding to each of the plurality of drivers and delivery locations corresponding to each of the plurality of delivery routes. For example, delivery management computing device 102 may determine RF scores for each of the plurality of drivers for each of the plurality of delivery routes in accordance with equation 1 or equation 3, or using one or more supervised machine learning models that learn the function described in equation 5, above.

At step 708, at least one of the plurality of drives is assigned to at least one of the plurality of delivery routes based on the familiarity values. For example, delivery management computing device 102 may determine driver to route assignments based on maximizing a sum total of the RF scores, such as in accordance with a bipartite graph model (e.g., equations 6-9 above). At step 710, the assignments are stored in a data repository. For example, delivery management computing device 102 may store the assignments in database 116 as assigned routes 306B. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a memory device; and
a computing device communicatively coupled to the memory device, wherein the computing device is configured to:
receive a plurality of current delivery routes to be assigned to a plurality of drivers;

receive historical route data for each of the plurality of drivers, wherein the historical route data identifies previous delivery routes for each of the plurality of drivers;

generate a first set of features based on a first portion of the historical route data for each of the plurality of drivers;

generate a second set of features based on a second portion of the historical route data for each of the plurality of drivers;

train a machine learning model by inputting the second set of features into the machine learning model to generate an output;

refine the trained machine learning model based on mapping the output to the first set of features;

generate, using the refined machine learning model, for each of the plurality of drivers, a plurality of familiarity values, each familiarity value corresponding to a current delivery route of the plurality of current delivery routes to be assigned, wherein each of the familiarity values is determined based on the historical route data corresponding to each driver;

determine an assignment of each of the plurality of drivers to at least one of the plurality of current delivery routes based on the familiarity values;

generate assignment data identifying the determined assignments of each of the plurality of drivers to the at least one of the plurality of current delivery routes; and store the assignment data within the memory device.

2. The system of claim 1, wherein the computing device is configured to receive driver preference data for each of the plurality of drivers, and determine each of the plurality of familiarity values based on the driver preference data corresponding to each driver.

3. The system of claim 1, wherein the computing device is configured to package the assignment data for each of the plurality of drivers within a corresponding route assignment message, and transmit the route assignment message to a computing device of each of the plurality of drivers.

4. The system of claim 1, wherein the computing device is configured to:

receive driver scheduling data for each of the plurality of drivers, wherein the driver scheduling data characterizes a work schedule; and determine each of the plurality of current delivery routes based on the driver scheduling data corresponding to each of the plurality of drivers.

5. The system of claim 1, wherein the computing device is configured to:

determine, for each of the previous delivery routes for each driver, one or more corresponding previous delivery locations;

determine, for each of the plurality of current delivery routes, one or more corresponding current delivery locations;

determine, for each of the plurality of current delivery routes, distance values based on the one or more corresponding current delivery locations and the one or more previous delivery locations for each of the previous delivery routes; and determine the plurality of familiarity values based on the distance values.

6. The system of claim 1, wherein the first portion of the historical route data corresponds to a first temporal period, and the second portion of the historical route data corresponds to a second temporal period.

7. The system of claim 6, wherein the computing device aggregates the first portion of the historical route data over several time periods within the first temporal period.

8. The system of claim 1, wherein the computing device is configured to:

aggregate the historical route data over a predetermined period of time, the predetermined period of time including a first time period and second time period, wherein the first set of features is associated with the first time period and the second set of features is associated with the second time period.

9. A method by a computing device comprising:

receiving a plurality of current delivery routes to be assigned to a plurality of drivers;

receiving historical route data for each of the plurality of drivers, wherein the historical route data identifies previous delivery routes for each driver;

generating a first set of features based on a first portion of the historical route data for each of the plurality of drivers;

generating a second set of features based on a second portion of the historical route data for each of the plurality of drivers;

training a machine learning model by inputting the second set of features into the machine learning model to generate an output;

refining the trained machine learning model based on mapping the output to the first set of features;

generating, using the refined machine learning model, for each of the plurality of drivers, a plurality of familiarity values, each familiarity value corresponding to a delivery route of the plurality of current delivery routes to be assigned, wherein each of the familiarity values is determined based on the historical route data corresponding to each driver;

determining an assignment of each of the plurality of drivers to at least one of the plurality of current delivery routes based on the familiarity values;

generating assignment data identifying the determined assignments of each of the plurality of drivers to the at least one of the plurality of current delivery routes; and storing the assignment data within a memory device.

10. The method of claim 9, comprising receiving driver preference data for each of the plurality of drivers, and determining each of the plurality of familiarity values based on the driver preference data corresponding to each driver.

11. The method of claim 9, comprising packaging the assignment data for each of the plurality of drivers within a corresponding route assignment message, and transmitting the route assignment message to a computing device of each of the plurality of drivers.

12. The method of claim 9, comprising:

receiving driver scheduling data for each of the plurality of drivers, wherein the driver scheduling data characterizes a work schedule; and determining each of the plurality of current delivery routes based on the driver scheduling data corresponding to each of the plurality of drivers.

13. The method of claim 9, comprising:

determining, for each of the previous delivery routes for each driver, one or more corresponding previous delivery locations;

determining, for each of the plurality of current delivery routes, one or more corresponding current delivery locations;

determining, for each of the plurality of current delivery routes, distance values based on the one or more corresponding current delivery locations and the one or more previous delivery locations for each of the previous delivery routes; and determining the plurality of familiarity values based on the distance values.

14. The method of claim 9, wherein the first portion of the historical route data corresponds to a first temporal period, and the second portion of the historical route data corresponds to a second temporal period.

15. The method of claim 14, wherein the method comprises aggregating the first portion of the historical route data over several time periods within the first temporal period.

16. The method of claim 9, comprising:
aggregating the historical route data over a predetermined period of time, the predetermined period of time including a first time period and second time period, wherein the first set of features is associated with the first time period and the second set of features is associated with the second time period.

17. A non-transitory computer readable medium having instructions stored thereon, wherein the instructions, when executed by at least one processor, cause a device to perform operations comprising:
receiving a plurality of current delivery routes to be assigned to a plurality of drivers;
receiving historical route data for each of the plurality of drivers, wherein the historical route data identifies previous delivery routes for each driver;
generating a first set of features based on a first portion of the historical route data for each of the plurality of drivers;
generating a second set of features based on a second portion of the historical route data for each of the plurality of drivers;
training a machine learning model by inputting the second set of features into the machine learning model to generate an output;
refining the trained machine learning model based on mapping the output to the first set of features;
generating, using the refined machine learning model, for each of the plurality of drivers, a plurality of familiarity values, each familiarity value corresponding to a delivery route of the plurality of current delivery routes to be assigned, wherein each of the familiarity values is determined based on the historical route data corresponding to each driver;
determining an assignment of each of the plurality of drivers to at least one of the plurality of current delivery routes based on the familiarity values;
generating assignment data identifying the determined assignments of each of the plurality of drivers to the at least one of the plurality of current delivery routes; and
storing the assignment data within a memory device.

18. The non-transitory computer readable medium of claim 17, wherein the instructions, when executed by the at least one processor, cause the device to perform operations comprising receiving driver preference data for each of the plurality of drivers, and determining each of the plurality of familiarity values based on the driver preference data corresponding to each driver.

19. The non-transitory computer readable medium of claim 17, wherein the instructions, when executed by the at least one processor, cause the device to perform operations comprising:
determining, for each of the previous delivery routes for each driver, one or more corresponding previous delivery locations;
determining, for each of the plurality of current delivery routes, one or more corresponding current delivery locations;
determining, for each of the plurality of current delivery routes, distance values based on the one or more corresponding current delivery locations and the one or more previous delivery locations for each of the previous delivery routes; and
determining the plurality of familiarity values based on the distance values.

20. The non-transitory computer readable medium of claim 17, wherein the instructions, when executed by the at least one processor, cause the device to perform operations comprising:
aggregating the historical route data over a predetermined period of time, the predetermined period of time including a first time period and second time period, wherein the first set of features is associated with the first time period and the second set of features is associated with the second time period.

* * * * *